Nov. 10, 1942.                W. T. COOPER                 2,301,524
                             RAKE ATTACHMENT
                           Filed Feb. 25, 1942            2 Sheets-Sheet 1
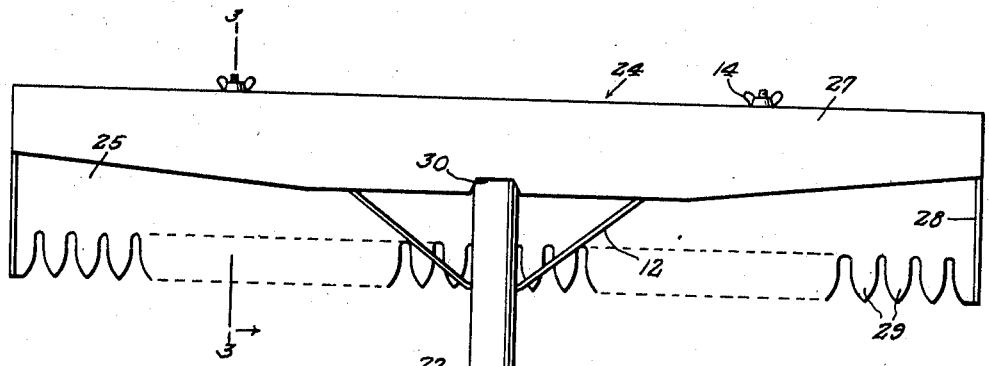
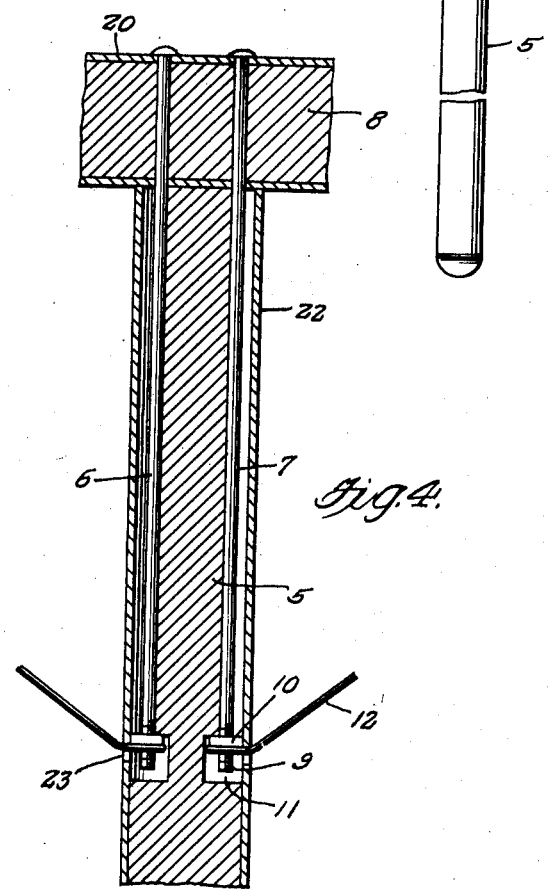
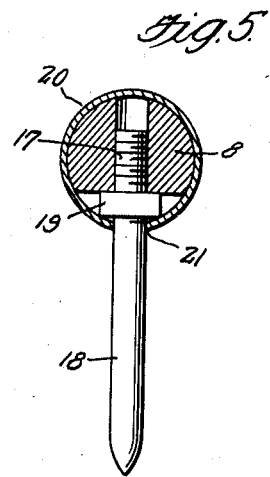
Inventor
William Theodore Cooper,
By *Clarence A. O'Brien*
*and Harvey B. Jacobson*
Attorneys Nov. 10, 1942.  W. T. COOPER  2,301,524
RAKE ATTACHMENT
Filed Feb. 25, 1942  2 Sheets-Sheet 2
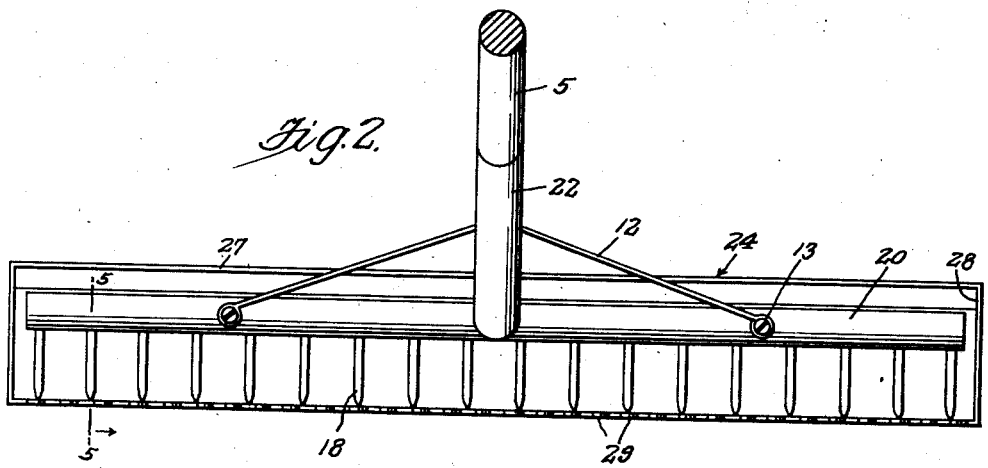
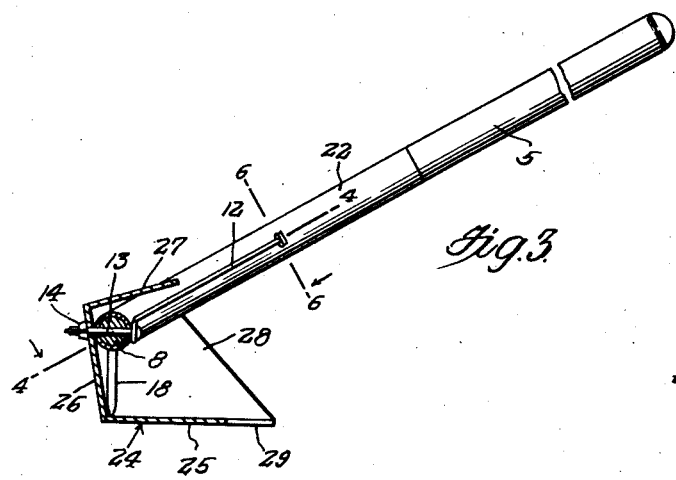
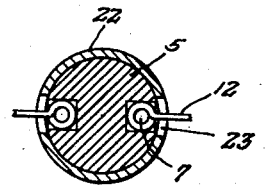
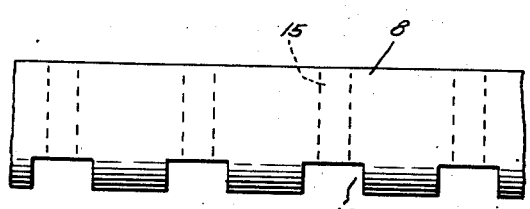
Inventor
William Theodore Cooper.
By Clarence A. O'Brien
and Harvey B. Jackson
Attorneys Patented Nov. 10, 1942

2,301,524

UNITED STATES PATENT OFFICE 2,301,524

RAKE ATTACHMENT

William Theodore Cooper, San Bernardino, Calif.

Application February 25, 1942, Serial No. 432,352

3 Claims. (Cl. 56—400.13)

The present invention relates to new and useful improvements in rakes and has for its primary object to provide a scoop attachment for the rake adapted for detachable connection with the rake in a simple and practical manner and which is adapted for dragging over the surface of a lawn for picking up leaves, trash, and other articles without injuring the grass.

The invention is designed primarily for use in the maintenance of golf courses and includes a rake construction having removable tines adapted for smoothing out the sand in sand traps and also including a detachable scoop which is secured to the tine-equipped head of the rake and encloses the tines so as to prevent contact of the tines with the grass of a golf green while dragging the scoop over the green to remove leaves, trash, and other material therefrom.

A further object of the invention is to provide a rake of simple and practical construction, which is neat and attractive in appearance, relatively inexpensive to manufacture, and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout and in which:

Figure 1 is a top plan view.

Figure 2 is a rear elevational view.

Figure 3 is a transverse sectional view taken substantially on a line 3—3 of Figure 1.

Figure 4 is a fragmentary longitudinal sectional view through the handle taken substantially on a line 4—4 of Figure 3.

Figure 5 is a vertical sectional view through the rake head taken substantially on a line 5—5 of Figure 2.

Figure 6 is a transverse sectional view through the handle taken substantially on a line 6—6 of Figure 3, and Figure 7 is a fragmentary plan view of the rake head with the sleeve removed therefrom.

Referring now to the drawings in detail wherein for the purpose of illustration I have disclosed a preferred embodiment of the invention, the numeral 5 designates the handle of the rake having a pair of longitudinally extending grooves 6 formed at opposite sides thereof adjacent the lower end of the handle and within which rods 7 are positioned. One end of the rod 7 extends transversely of the crosshead 8 which is positioned at the end of the handle 5 while the other end of the rods 7 are threaded, as shown at 9, and provided with nuts 10 positioned in recesses 11 at the upper ends of the grooves 6 for drawing the head 8 against the end of the handle when the nuts 10 are tightened on the rods. Also on the upper ends of the rods 7 are attached brace rods 12 extending laterally outwardly with respect to the handle and are secured to the crosshead 8 by means of bolts 13, having wing nuts 14 thereaded thereon.

The head 8 is formed with transversely extending openings 15 terminating at the undersides of the head in countersinks 16, the openings 15 being adapted to receive the threaded upper ends 17 of tines 18 which are also provided with jamb nuts 19 seated in the countersinks 16 to prevent accidental displacement of the tines. The crosshead 8 is also enclosed in a sleeve 20 in which openings 21 are formed to accommodate the tines. The lower end of the handle 5 is also enclosed in a sleeve 22 covering the rods 7 and grooves 6, the sleeve 22 having openings 23 therein to accommodate the braces 12.

A scoop attachment 24 is attached to the crosshead 8 by means of the bolts 13 and wing nuts 14, the scoop including a bottom wall 25, front wall 26, top wall 27, and end walls 28. The open side of the scoop faces rearwardly and the rear edge of the bottom 25 is formed with teeth 29 extending rearwardly in the plane of the bottom wall.

The top wall 27 is formed with a notch 30 to accommodate the handle 5 as shown to advantage in Figure 1 of the drawings.

The scoop 24 encloses the tines 18 when the scoop is in attached position and upon dragging the scoop rearwardly on the surface of the grass the leaves and other trash will be collected within the scoop for convenient removal from the lawn.

It is believed the details of construction and manner of use of the device will be readily understood from the foregoing without further detailed explanation.

Having thus described the invention what I claim is:

1. A rake comprising a handle, a crosshead at the front end of the handle and adapted to support a plurality of rake tines, braces extending from the handle to the crosshead, bolts securing the braces to the crosshead, and a scoop enclosing the crosshead and the tines, said scoop including a front wall attached to said bolts, and a top wall having a notch in its rear edge for receiving the handle, the rear of the scoop being open for receiving material by dragging the rake in a rearward direction.

2. A rake comprising a handle having longitudinal grooves at its front end, a crosshead transversely of the front end of the handle, rods positioned in said grooves and engaging the crosshead for securing the latter to the handle, a sleeve on said front end of the handle enclosing the rods, transverse openings in the crosshead, tines having one end removably secured in said openings, and a sleeve on said crosshead having openings receiving the tines.

3. A rake comprising a handle, a crosshead secured transversely of the front end of the handle, said crosshead having vertical openings therein and provided with countersinks at one end, nuts in the countersinks, tines having one end threaded on the nuts and projecting into the openings and a sleeve on the crosshead for retaining the tines and nuts in position, said sleeve having openings receiving the tines.

WILLIAM THEODORE COOPER.